US012806635B2

(12) United States Patent
Beattie et al.

(10) Patent No.: US 12,806,635 B2
(45) Date of Patent: Nov. 24, 2026

(54) HYPERION HANDLE WITH DIVERTER

(71) Applicant: Kohler Mira Limited, Cheltenham (GB)

(72) Inventors: Colin Beattie, Gloucestershire (GB); Oliver Jones, Cheltenham (GB)

(73) Assignee: Kohler Mira Limited, Cheltenham (GB)

(*) Notice: Subject to any disclaimer, the term of this patent is extended or adjusted under 35 U.S.C. 154(b) by 136 days.

(21) Appl. No.: 18/958,938

(22) Filed: Nov. 25, 2024

(65) Prior Publication Data

US 2025/0198140 A1 Jun. 19, 2025

Related U.S. Application Data

(60) Provisional application No. 63/610,241, filed on Dec. 14, 2023.

(51) Int. Cl.

| | |
|---|---|
| ***E03C 1/04*** | (2006.01) |
| ***B05B 1/16*** | (2006.01) |
| ***B05B 1/18*** | (2006.01) |
| ***E03C 1/02*** | (2006.01) |

(52) U.S. Cl.

CPC .......... *E03C 1/0409* (2013.01); *B05B 1/1636* (2013.01); *B05B 1/1886* (2025.08); *B05B 1/1892* (2025.08); *B05B 1/18* (2013.01); *E03C 2001/026* (2013.01)

(58) Field of Classification Search

CPC ....... B05B 1/16; B05B 1/1627; B05B 1/1636; B05B 1/18; B05B 1/1823; B05B 1/1824; B05B 1/1825; B05B 1/188; B05B 1/1884; B05B 1/1886; B05B 1/189; B05B 1/1892; B05B 1/1896; B05B 12/002;

(Continued)

(56) References Cited

U.S. PATENT DOCUMENTS

2017/0100727 A1* 4/2017 Lin ...................... B05B 1/1636
2017/0120261 A1* 5/2017 Zhou ..................... B05B 12/002
2018/0065131 A1* 3/2018 Rogers ...................... B05B 1/18

(Continued)

FOREIGN PATENT DOCUMENTS

CN 114377867 A 4/2022
CN 115025898 A 9/2022

OTHER PUBLICATIONS

European Official Action dated May 14, 2025 issued in corresponding European application.

*Primary Examiner* — Darren W Gorman

(74) *Attorney, Agent, or Firm* — Husch Blackwell LLP

(57) ABSTRACT

A showerhead is provided herein which may include a diverter handle and a head portion connected to the diverter handle. The diverter handle may alter the water output spray that exits the head portion. The diverter handle may include a guide component including at least one guide track, a rotary cam connected to the guide component, a handle output including output passageways, a diverter for at least one of opening or closing the output passageways, and a slider mechanism including a sleeve that includes at least one post that engages the at least one guide track. The slider mechanism may be adjusted between positions, causing the guide component and the rotary cam to rotate, which may cause different output passageways to be open and/or closed.

23 Claims, 11 Drawing Sheets

(58) Field of Classification Search
CPC .. E03C 1/0409; E03C 2001/026; F16K 11/07; F16K 11/0716
See application file for complete search history.

(56) References Cited

U.S. PATENT DOCUMENTS

2022/0226838 A1* 7/2022 Lin ........................... B05B 1/08
2023/0271200 A1* 8/2023 Lee ....................... B05B 1/1636
239/443

* cited by examiner

HYPERION HANDLE WITH DIVERTER

CROSS-REFERENCE TO RELATED APPLICATIONS

The present application claims priority to U.S. Provisional Patent Application No. 63/610,241, filed Dec. 14, 2023, entitled, "HYPERION HANDLE WITH DIVERTER," the entire contents of which are hereby incorporated by reference.

BACKGROUND

It may be desirable for showerheads and handsets to have various settings and create various spray patterns. Such settings and spray patterns may be achieved by diverting fluid in different ways. Such diversion may be achieved within the head portion of the showerhead and handset.

Figure 1:
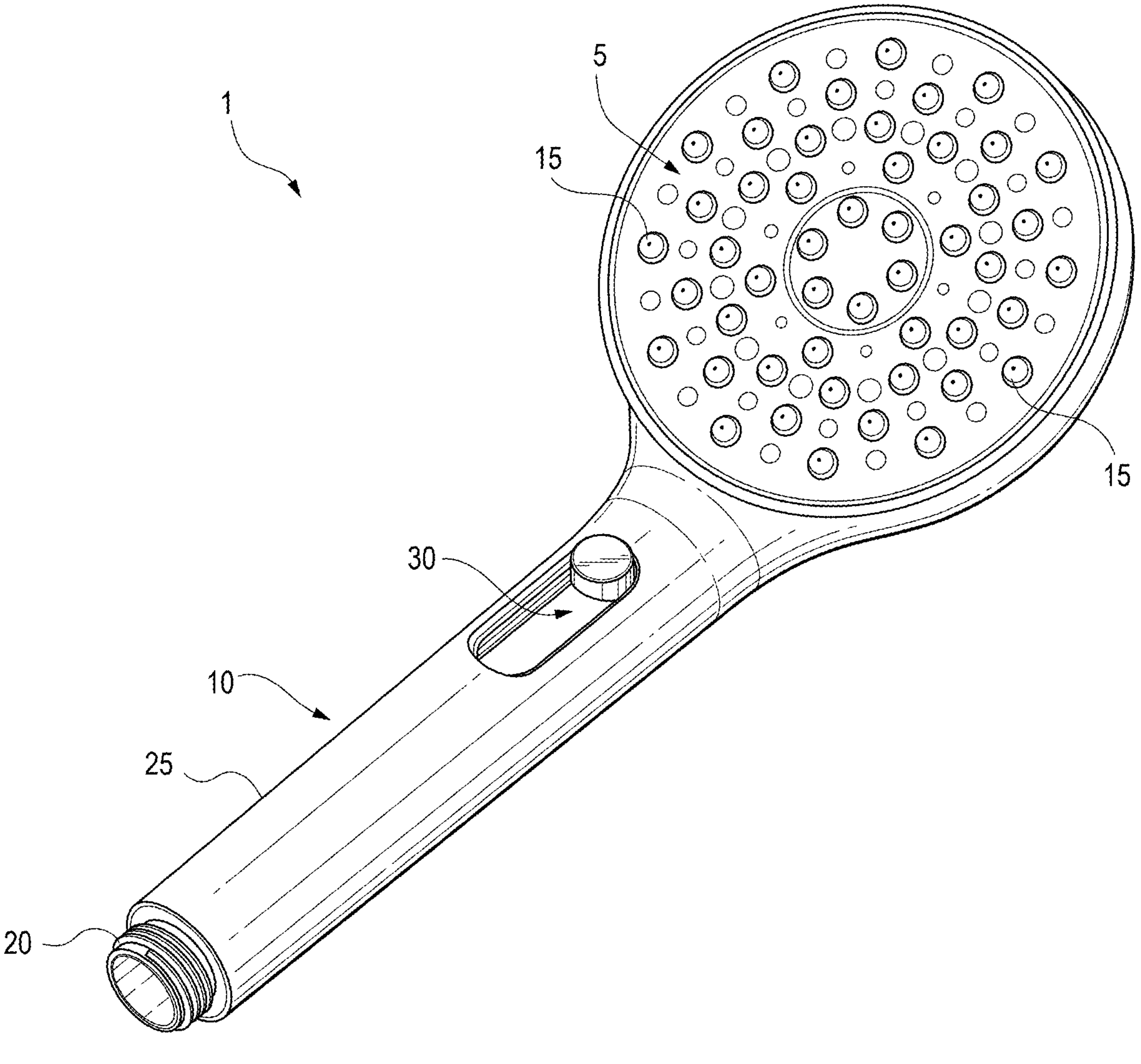
FIG. 1 is a perspective view of an example showerhead including an example diverter handle.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Turning first to FIG. 1, a showerhead 1 may include a head portion 5 integrally formed with, attached to, or connected to a diverter handle 10. The diverter handle 10 as described herein may be attached to, connected to, contained within, or integrated with systems and ablutionary fittings.

The ablutionary fittings may be any ablutionary fitting now known or hereafter developed, including, but not limited to, a handset, showerhead, etc. The diverter handle 10 as described herein may be attached to, connected to, contained within, or integrated with, for example, handsets and showerheads and other devices.

The head portion 5 may be any now known or hereafter developed head portion of a showerhead and may include nozzles 15 in any formation as desired. The diverter handle 10 may be integrally formed with the head portion 5 such that it is a single component. The diverter handle 10 may be a separate component apart from the head portion 5. When separate, the diverter handle 10 may be standardized such that it may be attached and connected to various different head portions 5. The diverter handle 10 may be integrally formed with, attached to, or connected to the head portion 5 in any suitable manner, including, but not limited to, via a bayonet, threads, a plurality of clips, or ultrasonic welding of the diverter handle 10 to the head portion 5. The diverter handle 10 may attach at a base 20 to a fluid input (not illustrated). As discussed with greater detail herein, the diverter handle 10 may divert fluid, which may be water or any other suitable fluid, in a selectable manner and may control fluid flow to the head portion 5. The diverter handle 10 may include a handle body 25 which may serve to protect interior components of the diverter handle 10. The diverter handle 10 may include a slider mechanism 30 which may be used to control the flow of fluid.

Figure 2:
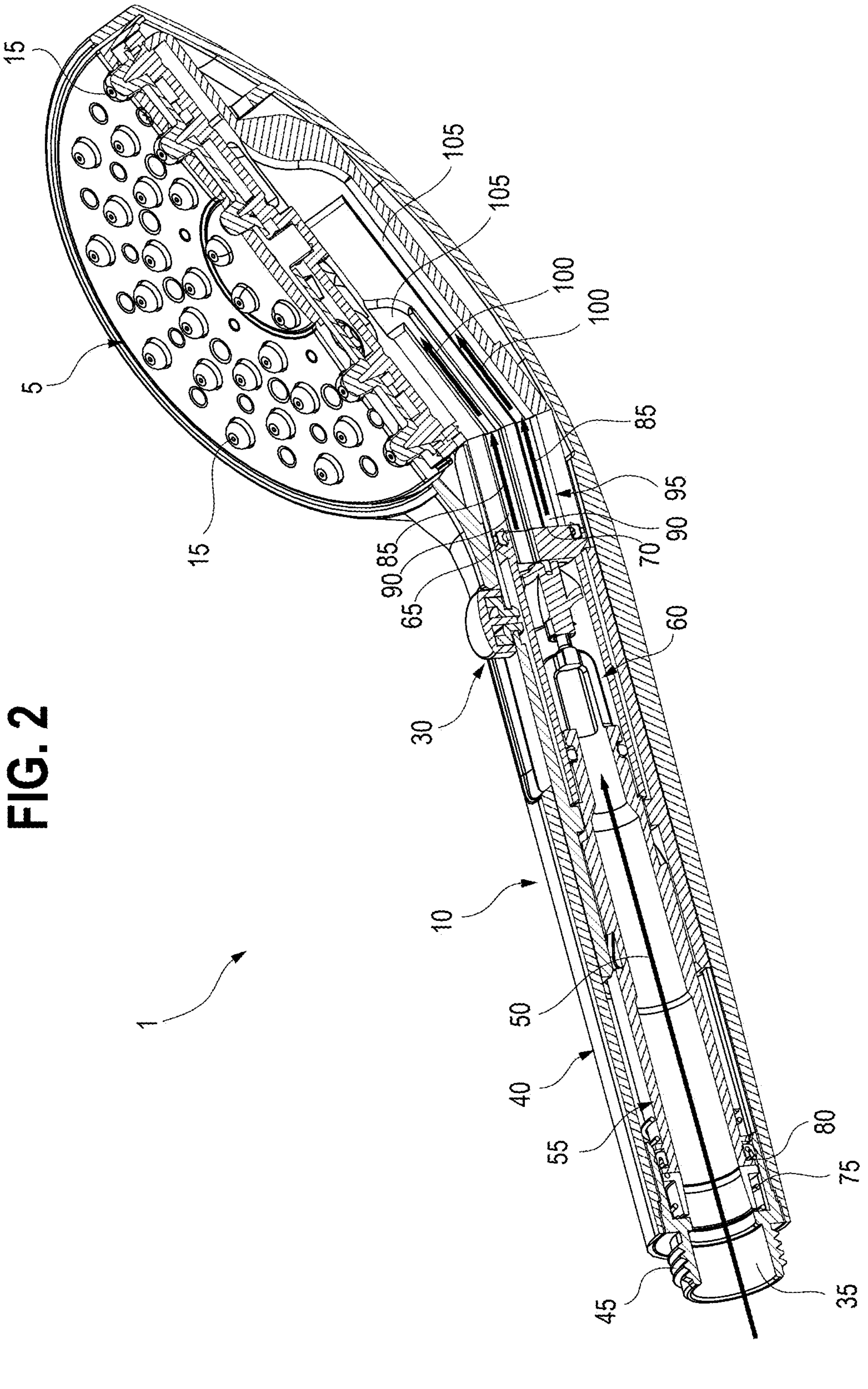
FIG. 2 is a first cross-sectional view of the example diverter handle of FIG. 1.

Turning to FIG. 2, fluid may enter the diverter handle 10 at an entry point 35 of an intake pipe 40, which may be located at the base 20 of the diverter handle 10. The intake pipe 40 may include threads 45 or other structures for attaching the intake pipe 40 to a fluid input. The fluid may travel in the direction of arrow 50 through the intake pipe 40, into and through a guide component 55, and into and through a rotary cam 60. The guide component 55 and rotary cam 60 may be fixed to one another in any suitable manner, including, but not limited to, being integrally formed with, attached to, or connected to one another. This configuration may allow for movement of the rotary cam 60 to cause movement of the guide component 55.

A lip seal 65 may be placed at a connection point 70 between the rotary cam 60 and the head portion 5. The lip seal 65 may aid in preventing fluid from leaking out of the diverter handle 10 via the connection point 70. The lip seal 65 may have less friction than an o-ring seal, which may assist in maintaining a low amount of friction when the rotary cam 60 is rotated, as discussed in greater detail below. A spring 75 may be placed at a base 80 of the guide component 55 and may apply a substantially consistent amount of force to the lip seal 65 at the connection point 70.

The fluid may travel in the direction of arrows 85 after passing through the rotary cam 60 and may exit diverter handle 10 via output passageways 90 on the handle output 95. The fluid may then travel in the direction of arrows 100 through nozzle passageways 105, which may be coupled to particular nozzles 15 of the showerhead 1. The fluid may exit different nozzles 15 based on the positioning of the rotary cam 60.

Figure 3:
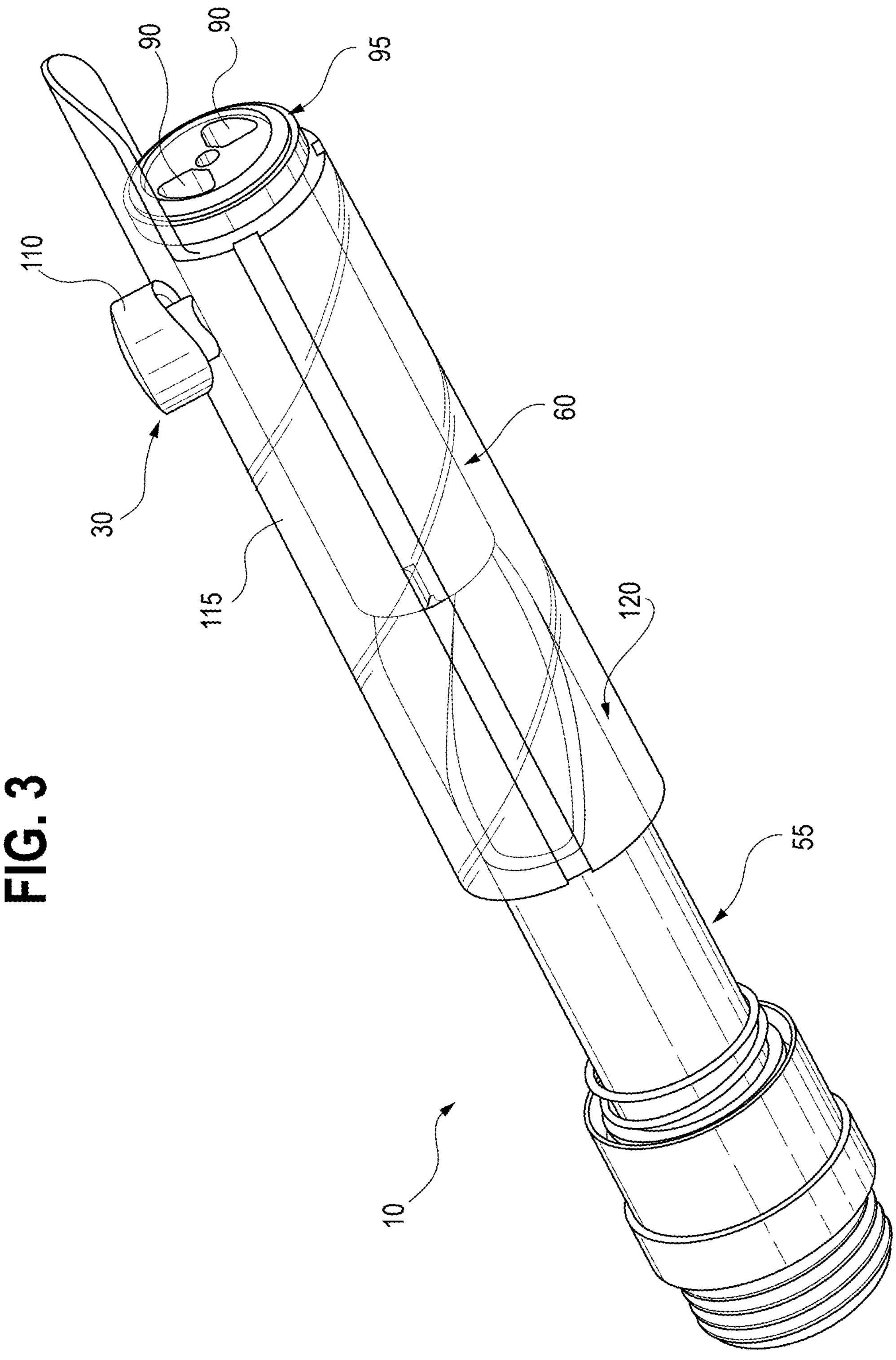
FIG. 3 is a first perspective view of the example diverter handle of FIG. 1.

A user may activate the different positions of the rotary cam 60, and as such, different output passageways 90, by adjusting the slider mechanism 30. Turning to FIG. 3, the slider mechanism 30 of the diverter handle 10 may engage with the rotary cam 60 that is formed or otherwise connected to the guide component 55, such that when the slider mechanism 30 is adjusted, different output passageways 90 of the handle output 95 may be opened and/or closed.

Although the handle output 95 of FIG. 3 includes two output passageways 90, any number of output passageways may be envisioned. The slider mechanism 30 may include a switch button 110 attached to or integrally formed with an elongate portion 115, though other actuation mechanisms may be used. The elongate portion 115 may be attached to or integrally formed with a sleeve 120 which may engage with the guide component 55.

Figure 4:
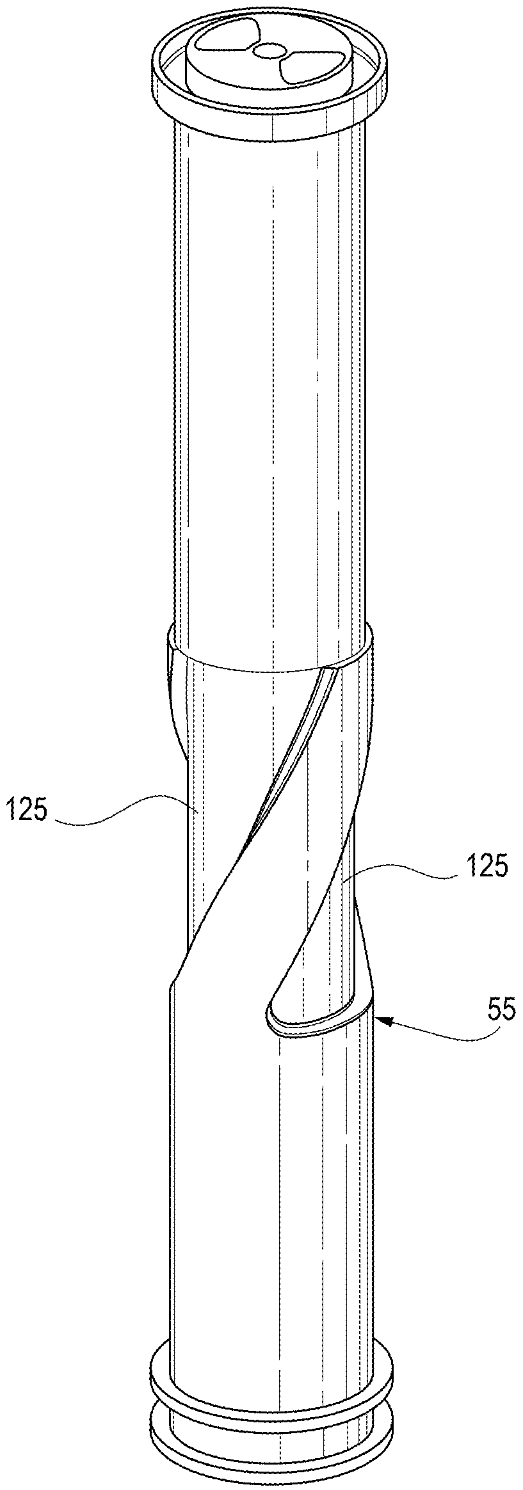
FIG. 4 is a second perspective view of the example diverter handle of FIG. 1.

As illustrated in FIG. 4, the guide component 55 may include guide tracks 125. The guide tracks 125 may be any suitable size and shape and may be formed into the guide component 55. The guide tracks 125 may be formed as depressions into the guide component 55. The guide tracks 125 may be substantially rhombus-shaped and may be formed around and into the substantially cylinder-shaped guide component 55. Although the guide component 55 of FIG. 4 includes two guide tracks 125, any number of guide tracks may be envisioned. The guide tracks 125 may be used to rotate the guide component 55, and due to the connection between the two, the rotary cam 60.

Figure 5:
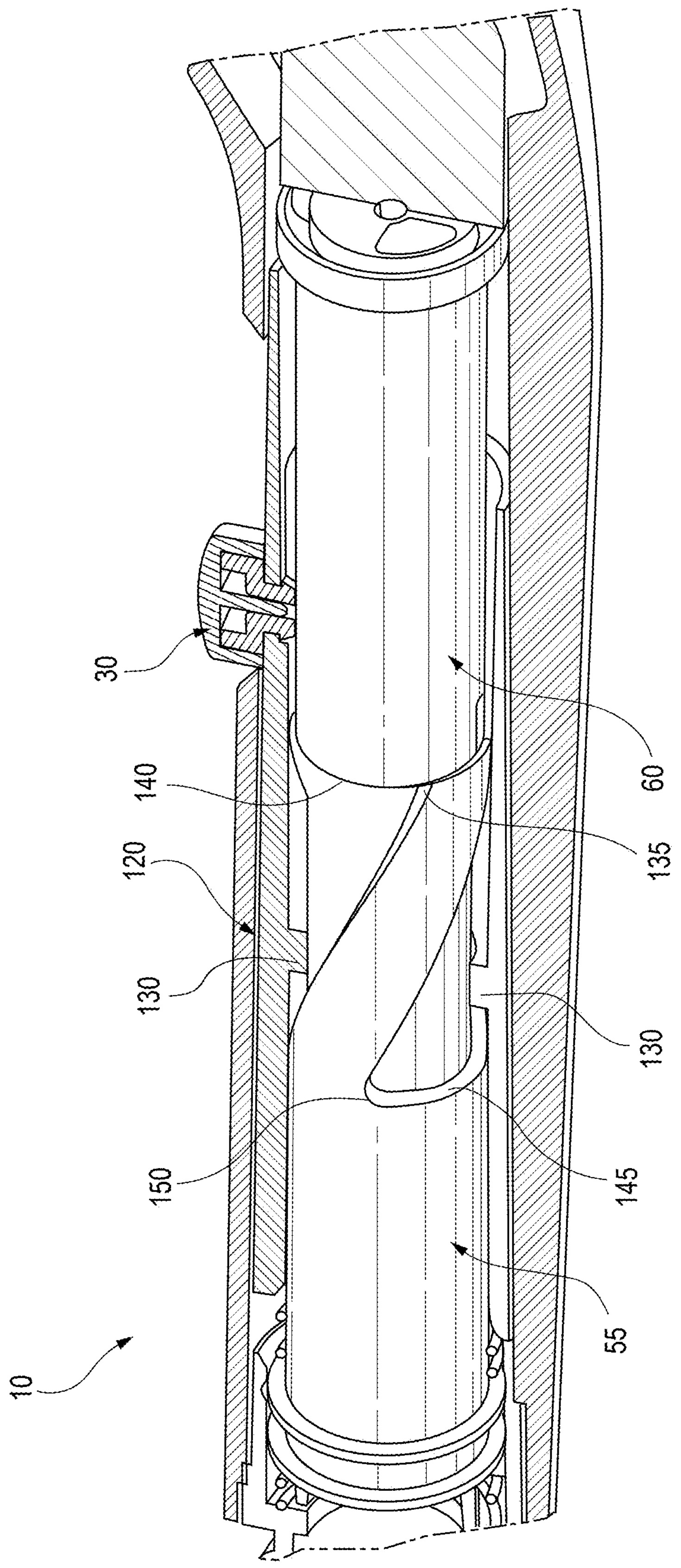
FIG. 5 is a first top view of the example diverter handle of FIG. 1.

Turning to FIG. 5, the sleeve 120 may include posts 130 which may engage with the guide tracks 125 of the guide component 55. The posts 130 may fit into the depressions of the guide tracks 125. The posts 130 may have a width that is shorter than a width of the guide tracks 125, such that the posts 130 can move and translate within the guide tracks 125. Such engagement may cause the guide component 55, and, as such, the rotary cam 60, to rotate as the slider mechanism 30 is translated within the diverter handle 10. The guide tracks 125 may be any suitable steepness. Less steep guide tracks 125 may allow the guide component 55 to rotate more than steeper guide tracks 125. As one example, when the guide tracks 125 are steeper, the guide component 55 may rotate 60 degrees, while when the guide tracks 125 are less steep, the guide component 55 may rotate 120 degrees.

The slider mechanism 30 may translate within the diverter handle 10 and may take any number of positions. In a first position, the posts 130 of the sleeve 120 may abut a first stop portion 135 of the guide tracks 125 at the connection point 140 between the guide component 55 and the rotary cam 60. In such a position, the slider mechanism 30 may be prevented from raising further toward the head portion 5. When the slider mechanism 30 is moved toward a second position, the posts 130 of the sleeve 120 may translate within the guide tracks 125. Such translation may cause the guide component 55 to rotate, such that the posts 130 of the sleeve 120 may abut a second stop portion 145 of the guide tracks 125 at a base 150 of the guide tracks 125. In such a position, the slider mechanism 30 may be prevented from moving lower toward the base 20 of the diverter handle 10. Although the foregoing positions are discussed, the slider mechanism 30 may take any number of positions when translating within the diverter handle 10 along the guide tracks 125. As discussed above, the steepness of the guide tracks 125 may cause a difference in rotatability of the guide component 55. When steeper, the guide component 55 may only rotate a certain amount such that only certain ports may be open or closed to fluid flow.

Figure 6:
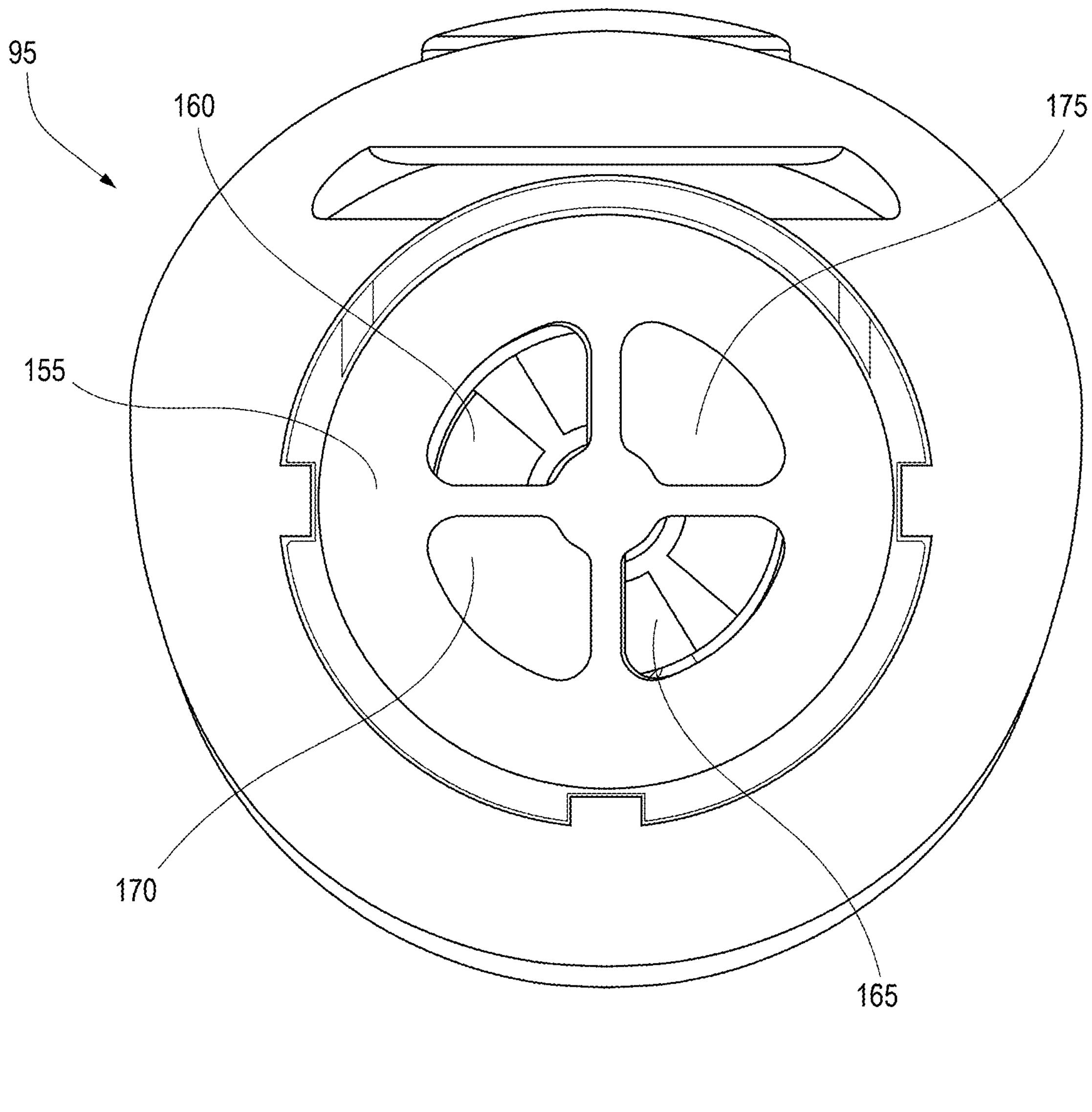
FIG. 6 is a second top view of the example diverter handle of FIG. 1.

Turning now to FIG. 6, the handle output 95 may include a diverter 155 with open output passageways 160, 165 and closed output passageways 170, 175. The open output passageways 160, 165 may be similar to the output passageways 90 as discussed with reference to FIG. 3. Although two open output passageways 160, 165 and two closed output passageways 170, 175 are illustrated in FIG. 6, there may be any number of open output passageways and closed output passageways. When the guide component 55 rotates, as discussed above, the handle output 95 may also rotate. Such rotation may cause a spray pattern of fluid exiting the handle output 95 to vary, as different output passageways 90 may be open, causing water to flow into different nozzle passageways 105 and out of different nozzles 15.

Figure 7:
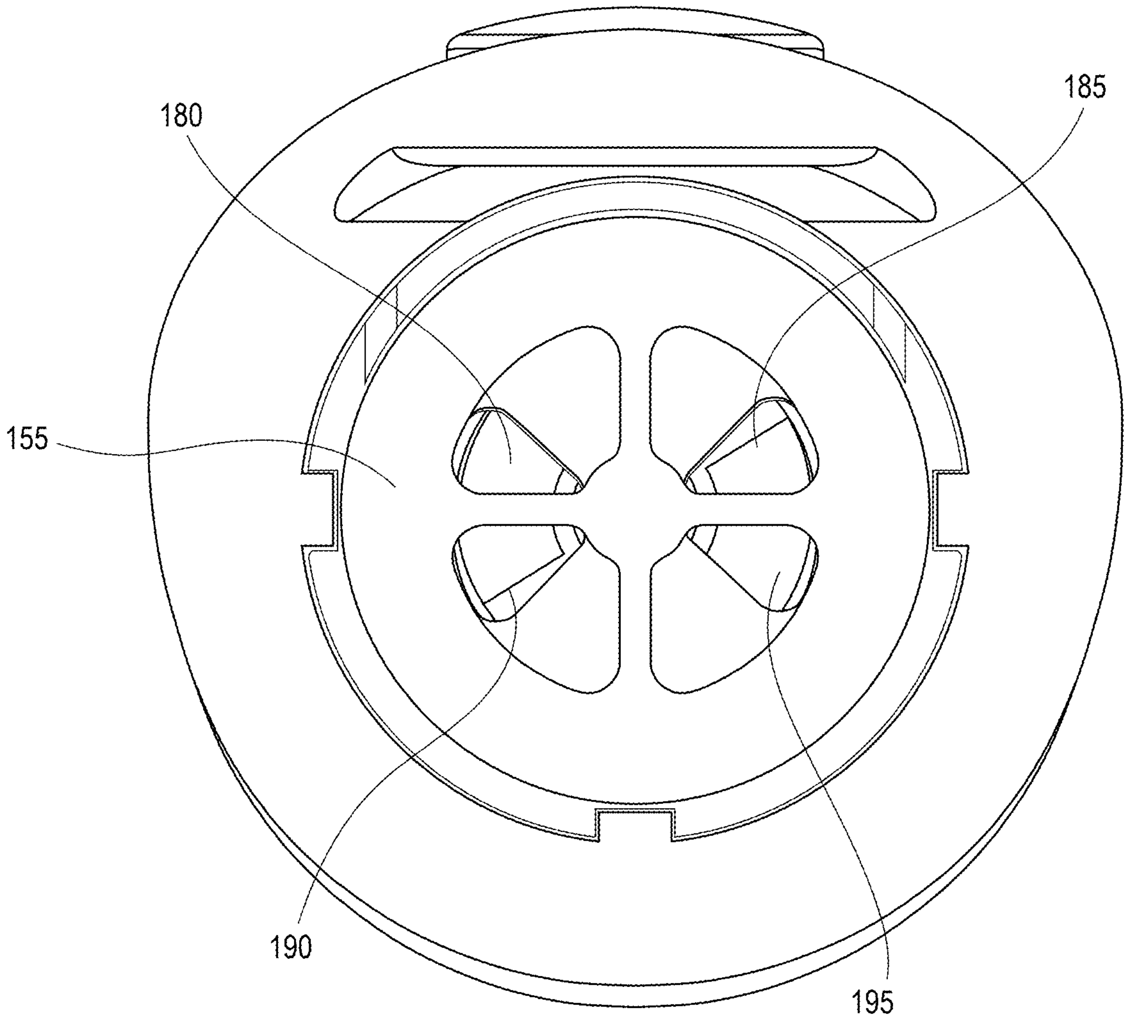
FIG. 7 is a third top view of the example diverter handle of FIG. 1.
Figure 8:
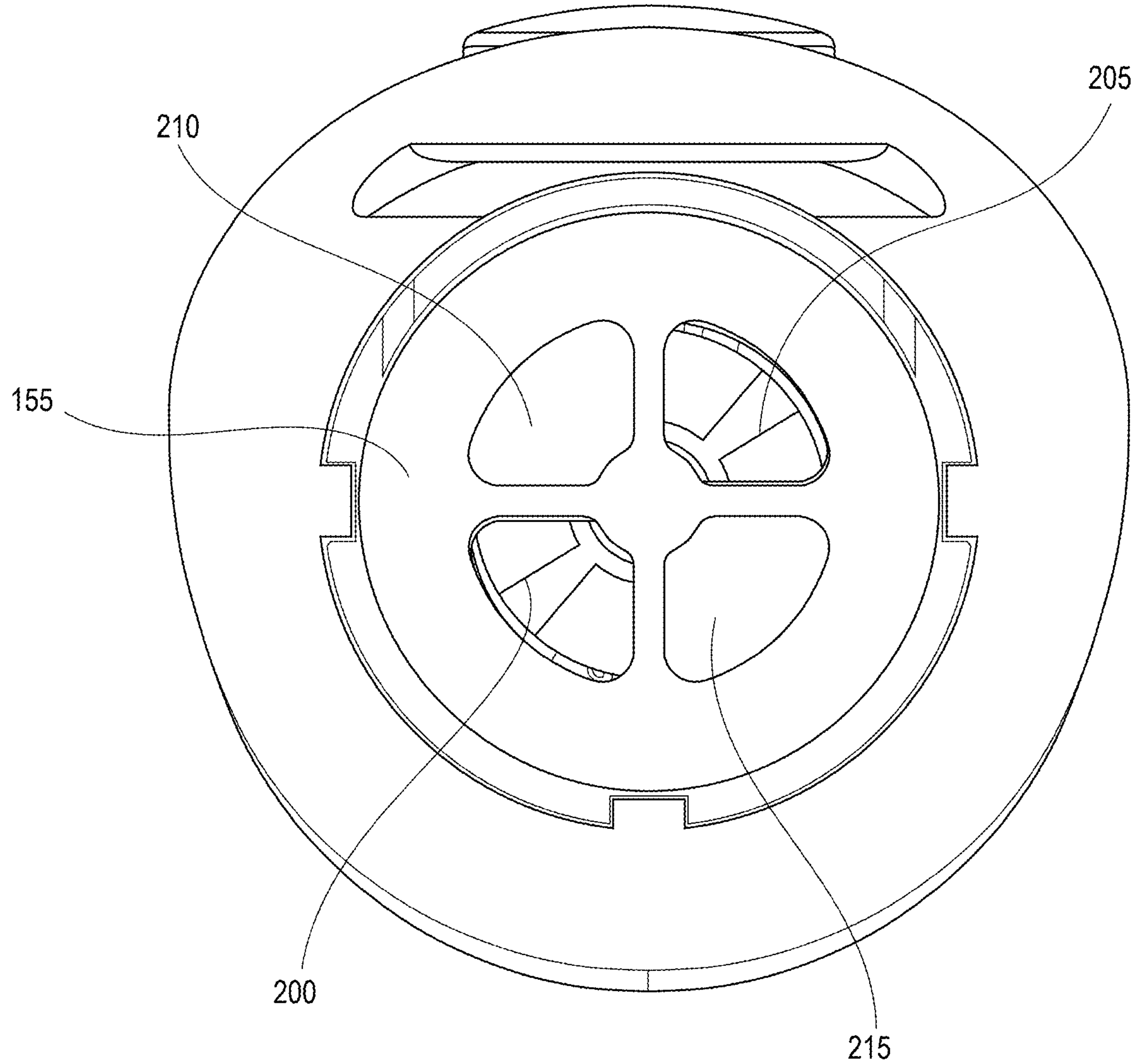
FIG. 8 is a fourth top view of the example diverter handle of FIG. 1.

In a first position of rotation of the rotary cam 60 caused by rotation of the guide component 55, as illustrated in FIG. 6, fluid may only flow through open output passageways 160, 165 of the diverter 155. No fluid may flow through passageways 170, 175, as they are closed off by the diverter 155. As discussed above, the slider mechanism 30 may be translated to cause the guide component 55, and as such, the rotary cam 60, to be rotated to any number of positions. Such rotation may cause the diverter 155 to be partially open to certain passageways. As illustrated in FIG. 7, the rotary cam 60 may be rotated to a second position such that fluid may flow partially through output passageways 180, 185, 190, 195, a the diverter 155 does not necessarily cover any of the passageways. In a third position of rotation of the rotary cam 60 caused by rotation of the guide component 55, as illustrated in FIG. 8, fluid may only flow through open output passageways 200, 205 of the diverter 155. No fluid may flow through passageways 210, 215, as they closed off by the diverter 155.

Figure 9:
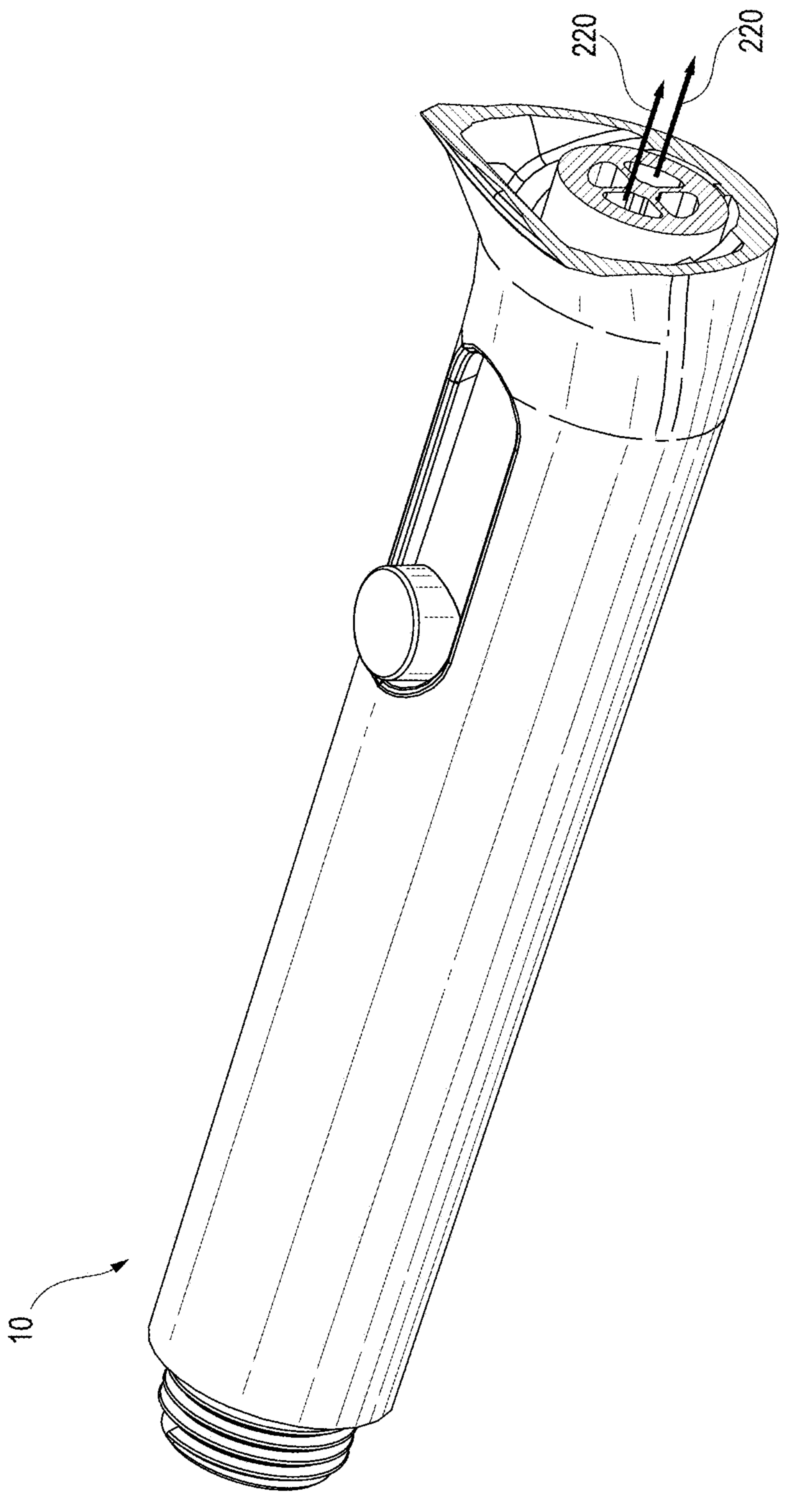
FIG. 9 is a perspective view of a first fluid flow which may be achieved via the example diverter handle of FIG. 1.
Figure 10:
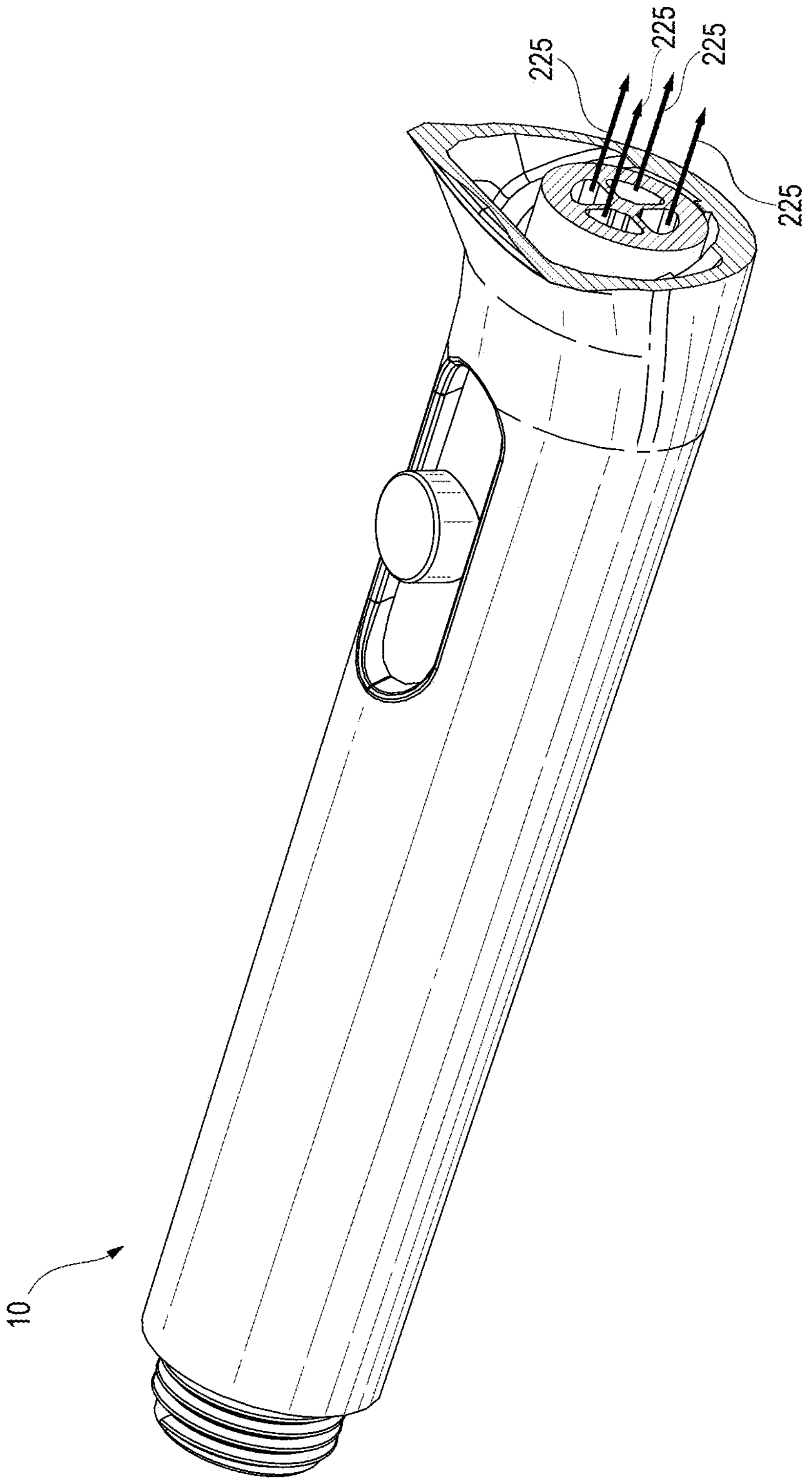
FIG. 10 is perspective view of a second fluid flow which may be achieved via the example diverter handle of FIG. 1.
Figure 11:
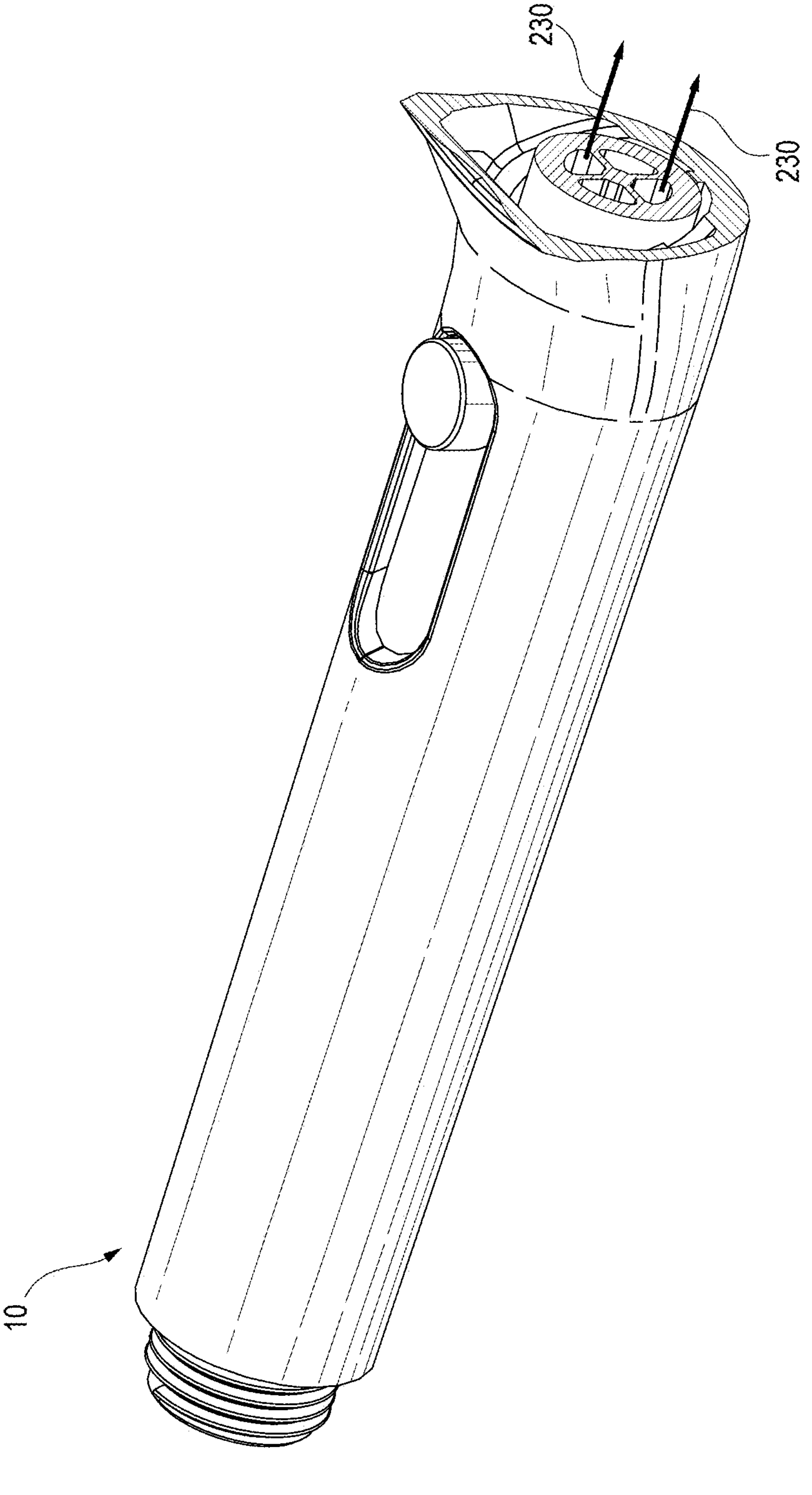
FIG. 11 is perspective view of a third fluid flow which may be achieved via the example diverter handle of FIG. 1.

As an example of such variable fluid flow, as illustrated in FIG. 9, the diverter handle 10 may provide fluid flow 220. Fluid flow 220 may be the result of the position of the diverter handle 10 of FIG. 6. As another example of such variable fluid flow, as illustrated in FIG. 10, the diverter handle 10 may provide fluid flow 225. Fluid flow 225 may be the result of the position of the diverter handle 10 of FIG. 7. As another example of such variable fluid flow, as illustrated in FIG. 11, the diverter handle 10 may provide fluid flow 230. Fluid flow 230 may be the result of the position of the diverter handle 10 of FIG. 8. Any number of arrangements may be achieved using the diverter handle 10 described herein, and any number of fluid flows may be associated with different arrangements of the diverter handle 10.

As is evident from the foregoing description, certain aspects of the present invention are not limited by the particular details of the examples illustrated herein, and it is therefore contemplated that other modifications, applications, variations, or equivalents thereof, will occur to those skilled in the art. Many such changes, modifications, variations, and other uses and applications of the present constructions will, however, become apparent to those skilled in the art after considering the specification and the accompanying drawings. In addition, unless mention was made above to the contrary, it should be noted that all of the accompanying drawings are not to scale. All such changes, modifications, variations, and other uses and applications which do not depart from the spirit and scope of the present inventions are deemed to be covered by the inventions which are limited only by the claims which follow.

The invention claimed is:

1. An ablutionary fitting comprising:

a diverter handle comprising:

a guide component including at least one guide track;

a rotary cam connected to the guide component;

a handle output including at least two output passageways;

a diverter for at least one of opening or closing the at least two output passageways; and a slider mechanism including a sleeve, wherein the sleeve includes at least one post that engages the at least one guide track;

wherein, when the slider mechanism is moved from a first position to a second position, the at least one post engages the at least one guide track, causing the guide component to rotate, further causing the rotary cam to rotate; and wherein when the rotary cam rotates, a first output passageway of the at least two output passageways is at least partially opened; and a head portion connected to the diverter handle, wherein fluid flowing through the diverter handle exits the ablutionary fitting via the head portion.

2. The ablutionary fitting of claim 1, wherein the head portion includes a plurality of nozzles.

3. The ablutionary fitting of claim 2, wherein the plurality of nozzles are connected to the at least two output passageways via a plurality of nozzle passageways.

4. The ablutionary fitting of claim 1, wherein the diverter handle further includes an intake port, wherein fluid flows into the diverter handle via the intake port.

5. The ablutionary fitting of claim 1, wherein when the slider mechanism is in the first position, the first output passageway is open.

6. The ablutionary fitting of claim 1, wherein when the slider mechanism is in the second position, a second output passageway of the at least two output passageways is at least partially open.

7. The ablutionary fitting of claim 1, wherein when the slider mechanism is in a third position, a second output passageway of the at least two output passageways is open.

8. The ablutionary fitting of claim 1, wherein the diverter handle and the head portion are integrally formed with one another.

9. A system comprising:

an ablutionary fitting;

a diverter handle, wherein the diverter handle is one of attached to, connected to, contained within, or integrated with the ablutionary fitting, the diverter handle including:

a guide component including a plurality of guide tracks;

a rotary cam connected to the guide component;

a handle output including a plurality of output passageways;

a diverter for at least one of opening or closing the plurality of output passageways; and a slider mechanism including a sleeve, wherein the sleeve includes a plurality of posts that each engage at least one of the plurality of guide tracks;

wherein, when each of the plurality of posts engage each of the plurality of guide tracks, the guide component rotates, causing the rotary cam to rotate; and wherein when the rotary cam rotates, at least one of the plurality of output passageways is at least partially opened; and a head portion connected to the diverter handle, wherein fluid flowing through the diverter handle exits the ablutionary fitting via the head portion.

10. The system of claim 9, wherein the head portion includes a plurality of nozzles.

11. The system of claim 10, wherein the plurality of nozzles are connected to the plurality of output passageways via a plurality of nozzle passageways.

12. The system of claim 9, wherein the diverter handle further includes an intake port, wherein fluid flows into the diverter handle via the intake port.

13. The system of claim 2, wherein when the slider mechanism is in a first position, a first output passageway of the plurality of output passageways is open.

14. The system of claim 13, wherein when the slider mechanism is in a second position, a first output passageway and a second output passageway of the plurality of output passageways are at least partially open.

15. The system of claim 14, wherein when the slider mechanism is in a third position, a second output passageway of the plurality of output passageways is open.

16. The system of claim 9, wherein the diverter handle and the head portion are integrally formed with one another.

17. An ablutionary fitting comprising:

a diverter handle comprising:

a guide component including at least one guide track;

a rotary cam connected to the guide component;

a handle output including at least two output passageways;

a diverter for at least one of opening or closing the at least two output passageways; and a slider mechanism including a sleeve, wherein the sleeve includes at least one post that engages the at least one guide track;

wherein, adjustment of the slider mechanism causes the guide component to rotate, causing the rotary cam to rotate; and wherein when the rotary cam rotates, at least one of the at least two output passageways is at least partially opened; and a head portion connected to the diverter handle.

18. The ablutionary fitting of claim 17, wherein the diverter handle further includes an intake port, wherein fluid flows into the diverter handle via the intake port, and wherein fluid flowing through the diverter handle exits the ablutionary fitting via the head portion.

19. The ablutionary fitting of claim 17, wherein the head portion includes a plurality of nozzles, and wherein the plurality of nozzles are connected to the at least two output passageways via a plurality of nozzle passageways.

20. The ablutionary fitting of claim 17, wherein when the slider mechanism is in a first position, a first output passageway of the at least two output passageways is at least partially open.

21. The ablutionary fitting of claim 1, wherein the ablutionary fitting is at least one of a showerhead and a handset.

22. The system of claim 9, wherein the ablutionary fitting is at least one of a showerhead and a handset.

23. The ablutionary fitting of claim 17, wherein the ablutionary fitting is at least one of a showerhead and a handset.

* * * * *